United States Patent Office 3,155,454
Patented Nov. 3, 1964

3,155,454
RECOVERY OF TRACE ELEMENT CATIONS
Murrell L. Salutsky, Silver Spring, Md., and Maria G. Dunseth, Arlington, Va., assignors to W. R. Grace & Co., New York, N.Y., a corporation of Connecticut
No Drawing. Filed Nov. 21, 1962, Ser. No. 239,346
6 Claims. (Cl. 23—1)

This invention relates to the treatment of metallic-cation containing waters. In one aspect, this invention relates to the treatment of metallic-cation containing brines, such as sea water, sewage water, oil well brines, and the like. Generally, this invention relates to a method for the recovery of valuable minerals from metallic-cation containing waters. More specifically, the invention deals with a method for recovering trace metals from dilute aqueous solutions. In another aspect, the invention relates to a method for removing trace elements from brines, thereby rendering the latter more suitable for conventional descaling.

In many of the brine-descaling processes known at present, scale-forming materials, specifically magnesium and calcium, are removed by precipitation as metal ammonium phosphates. This process essentially involves the addition of phosphoric acid or sodium phosphate along with an appropriate quantity of ammonia to the water to be descaled, and the separation of the mother liquor from the resulting precipitate. Detailed descriptions of this process and variations thereon can be found in U.S. Patent 3,042,606, to Salutsky and Bridger, and in copending application Serial Number 222,192, filed September 7, 1962. In these and similar processes, cations present only in trace quantities, such as $Cu^{++}$, $Co^{++}$, $Fe^{++}$, $Mn^{++}$, $Ni^{++}$ and $Zn^{++}$ are coprecipitated along with the major cations, $Mg^{++}$ and $Ca^{++}$, as the metal ammonium phosphates or other phosphates of these cations.

Spectrographic analysis of phosphates precipitated from an illustrative sample of sea water shows the following composition:

| | Percent |
|---|---|
| $P_2O_5$ | 30 |
| $MgO$ | 16 |
| $CaO$ | 3.4 |
| $Fe_2O_3$ | 0.01 |
| $SrO$ | 0.05–0.1 |
| $CuO$ | 0.006 |
| $Al_2O_3$ | 0.02 |
| $V_2O_5$ | <0.003 |
| $TiO_2$ | 0.04 |
| $Na_2O$ | 0.01–0.05 |
| $SiO_2$ | 0.05 |
| $B_2O_3$ | <0.02 |
| $MnO$ | 0.008 |
| $Cr_2O_3$ | <0.003 |

Zinc, nickel, and cobalt, also known to be present, did not show up at all.

Hence, although metal ammonium phosphate precipitation alone is satisfactory for ridding the water of most undesirable cations, and although it yields a product which is quite usable as a fertilizer, for any other application for the trace metals, the method is not presently economical. This becomes obvious when the cost of separating the trace metal precipitates from the major constitutents is considered.

In some fertilizer applications, such as those to be used where the soil is decidedly lacking in trace elements, it is desirable to add larger quantities of trace element metals than the amounts conventionally coprecipitated from sea water. Further, in numerous applications, it is desirable to isolate these trace element metal ammonium phosphates. Several, for example, have been suggested as fire retardants in paints and plastics. (See Japanese Patent No. 173,448 (1946); Dutch Patent No. 74,804 (1954); and the article by Vol'fkovich et al., "Ammonium Phosphates of Magnesium, Zinc, and Iron," Issledovaniya po Priklad. Khim., Akad. Nauk S.S.S.R., Otdel Khim. Nauk, 1955, 149; C.A. 50 6243g.) U.S. Patent No. 2,419,017 (1947) describes the use of ferrous ammonium phosphate as a rust inhibiting pigment. Zinc ammonium phosphate is described in U.S. Patent No. 2,555,224 (1951) as useful in preparing artificial pearl essences for ornamental plastics, and U.S. Patent No. 2,514,941 (1950) discloses its use to increase the corrosion resistance of metals. Many of the metal ammonium phosphates are possessed of beautiful pastel shades and have found utility in pigments in ceramic glazes. Among these are manganese, cadmium, cobalt, copper, nickel, ferrous, and zinc ammonium phosphate and various mixtures of these. Such uses are described in U.S. patent application Serial No. 53,923, filed September 6, 1960. And not to be overlooked is the fact that once these trace elements have been isolated in substantial quantities as metal ammonium phosphates, they may be chemically converted to other compounds of the same elements, thereby rendering the scope of utility almost limitless.

It is well known that sea water and similar brines contain vast quantities of materials. However, because of the great dilution it has not been economical in the past to recover most minerals, inasmuch as it did not seem reasonable to pump the tremendous quantities of water necessary to do so. Today, as the desalination of brines has become more of a reality, it has become necessary to deal with these large quantities.

It is an object of this invention, therefore, to provide an economical process whereby trace elements such as copper, cobalt, iron, manganese, nickel, zinc, and the like are removed from brines. It is a further object of this invention to provide a method wherein said trace elements are concentrated from brines and are economically obtained in greater quantities than would be expected from their natural concentration in said brines. Further objects will become apparent to those skilled in the art in view of the following description.

The instant invention is based on the discovery that certain metals, present in trace quantities in brines, will displace magnesium from magnesium ammonium phosphate when the latter compound is placed in contact with a dilute solution of the metal salt. This phenomenon is well demonstrated by the following illustration:

*Example I*

A chromatography column was filled with powdered reagent grade $MgNH_4PO_4 \cdot H_2O$. One liter of a prepared solution containing one gram each of $FeSO_4 \cdot 7H_2O$, $CuSO_4 \cdot 5H_2O$, $NiSO_4 \cdot 6H_2O$, and $CoSO_4 \cdot 7H_2O$ was percolated through the column. A high replacement capacity for the metal was indicated by intensely colored, definite chromatographic bands in the upper 20% of the column and no indication of colored ions in the effluent solution. The chromatographic bands in order going down the column were yellow, apple green, olive, greenish gray, and reddish purple, which correspond respectively to nickel, copper, iron and cobalt. To demonstrate recovery of metallic ions, the column was treated with ammonia; most of the copper was obtained as the copper-ammonium complex.

Without intending to be bound by theoretical considerations, the following is offered as an explanation of the phenomenon upon which the instant invention is based. It is believed that the magnesium ammonium phosphate acts in a manner similar to an ion exchange material, wherein the magnesium ion in the magnesium ammonium phosphate crystal lattice, and sometimes both the magnesium and ammonium are replaced with the trace element ions, to result in metal ammonium phosphates and free magnesium ions, or metal phosphates and free magnesium and ammonium ions. These processes are represented by the following equations:

(1) $Me^{++} + MgNH_4PO_4 \rightarrow MeNH_4PO_4 + Mg^{++}$ (2) $3Me^{++} + 2MgNH_4PO_4 \rightarrow Me_3(PO_4)_2 + 2Mg^{++} + 2NH_4^+$ (3) $Me^{+++} + MgNH_4PO_4 \rightarrow MePO_4 + Mg^{++} + NH_4^+$ wherein $Me^{++}$ and $Me^{+++}$ are metallic cations forming metal ammonium phosphates or metal phosphates more insoluble than magnesium ammonium phosphates. Reaction 1 is usually the one to prevail, since magnesium ammonium phosphate is the most soluble of the so-called insoluble metal ammonium phosphates. However, where the metallic cation is $Al^{+++}$ or the like, Reaction 2 or Reaction 3 is likely to prevail, since aluminum readily forms a metal phosphate which is less soluble than magnesium ammonium phosphate.

The application of this principle to large scale water treatment can be carried out in the following way. The brines to be treated are pumped through beds of magnesium ammonium phosphate prior to descaling, if they are to be descaled. The magnesium ammonium phosphate may be a pure material, or it may be the material ultimately recovered in the descaling processes described heretofore. Naturally, the degree of purity required would depend upon the ultimate use to which the recovered material would be put. The amount of water pumped through the bed would determine the quantity of trace element recovered. It is well within the scope of this invention to replace all of the magnesium in the bed, resulting in a mixed bed of trace element metal ammonium phosphates and metal phosphates, which could then be readily separated from one another by methods well known to the art. The point is that here, such separation would be an economically feasible venture, inasmuch as the trace elements are collected in quantities far exceeding their concentration in the original brine.

The applicability of the process described above to brines is further illustrated by the following example:

*Example II*

A chromatography column having an outer diameter of 1.5 cm. and a length of 8.5 cm. was filled with 6.0 grams of reagent grade $MgNH_4PO_4 \cdot H_2O$. Approximately 14 liters of raw sea water was filtered through No. 5 Whatman papers to remove any extraneous material, and was then percolated through the prepared column at the rate of one liter per day. A coloration developed at the top of the column, indicating the absorption of metals. After all of the sea water has passed through the column, the column was washed by elution with 250 milliliters of fresh water. The column was then split into three fractions. The top fraction weighing one gram (approximately 17% of the total weight) contained essentially all the colored material. The middle fraction contained about 17% of the total weight of the column material, and the remaining fraction, about 55%. The three fractions were analyzed by emission spectroscopy. A semiquantitative analysis of each of the three fractions and of the original $$MgNH_4PO_4 \cdot H_2O$$

used to prepare the column is given in the table below:

| Metallic Ion | Original $MgNHPO_4 \cdot H_2O$ | Top | Column Fraction Middle | Bottom |
| --- | --- | --- | --- | --- |
| | Percent | Percent | Percent | Percent |
| Ca | 0.1–0.5 | 1–5 | 1–5 | 1–5 |
| Fe | 0.001–0.005 | 0.01–0.05 | 0.001–0.005 | 0.001–0.005 |
| Mg | >10 | 10 | 10 | 10 |
| Zn | 0.01–0.05 | 0.2–0.7 | 0.1–0.5 | 0.01–0.05 |

It is obvious that using a larger quantity of sea water and large-scale beds of magnesium ammonium phosphate, numerous elements can be readily concentrated from sea water, the only requirement being that they form either an ammonium phosphate or a phosphate which is more insoluble than magnesium ammonium phosphate. Elements which can be recovered by the instant invention include aluminum, barium, calcium, cadmium, cerium, cobalt, copper, iron, lead, manganese, mercury, nickel, silver, tin, uranium, zinc, and many others, all of which are present in trace amounts in sea water and similar brines.

From the foregoing discussion it can be appreciated that we have been able to devise a novel method of recovery of trace metals from brines. Moreover, we have been successful in developing an economical recovery scheme whereby valuable minerals are recovered in usable form from sea water.

We claim:

1. A method for the removal of trace element cations from water containing the same, said cations being selected from the group consisting of aluminum, barium, calcium, cadmium, cerium, cobalt, copper, iron, lead, manganese, nickel, silver, tin, uranium, and zinc comprising percolating said water through a bed of magnesium ammonium phosphate and recovering the effluent.

2. A method for concentrating trace element metallic cations from brines containing the same, said cations being selected from the group consisting of aluminum, barium, calcium, cadmium, cerium, cobalt, copper, iron, lead, manganese, nickel, silver, tin, uranium, and zinc comprising percolating said brines through a bed of magnesium ammonium phosphate thereby replacing the magnesium ions in said magnesium ammonium phosphate with said trace element cations until a desired concentration of said trace element cations is present in said bed, and recovering the resulting bed of metal phosphates and metal ammonium phosphates.

3. A method for the removal of trace element metallic cations from sea water containing the same, said cations being selected from the group consisting of aluminum, barium, calcium, cadmium, cerium, cobalt, copper, iron, lead, manganese, nickel, silver, tin, uranium, and zinc prior to descaling said sea water comprising preparing a replacement bed of magnesium ammonium phosphate, percolating said sea water through said bed until substantially all of the magnesium in said magnesium ammonium phosphate has been replaced by said metallic cations, and recovering the effluent.

4. A method for concentrating trace element metallic cations from the group comprising aluminum, barium, calcium, cadmium, cerium, cobalt, copper, iron, lead, manganese, nickel, silver, tin, uranium, and zinc from sea water comprising preparing a replacement bed of magnesium ammonium phosphate, percolating said sea water through said bed until a desired concentration of said trace element is present in said bed, and recovering the resulting bed metal phosphates and metal ammonium phosphates.

5. A procedure for concentrating trace element metallic cations selected from the group consisting of aluminum, barium, calcium, cadmium, cerium, cobalt, copper, iron, lead, manganese, nickel, silver, tin, uranium, and zinc from sea water and descaling said sea water comprising the steps of:

(a) preparing a replacement bed of magnesium ammonium phosphate;

(b) percolating said sea water through said ion exchange bed thereby replacing the magnesium ion in said magnesium ammonium phosphate bed with said trace element metallic cations;

(c) recovering the thereformed bed which consists of residual manganese ammonium phosphate, trace metal ammonium phosphates, and trace metal phosphates;

(d) recovering the effluent from the magnesium ammonium phosphate bed;

(e) descaling said effluent so as to precipitate the magnesium ion contained therein as magnesium ammonium phosphate;

(f) recovering the descaled sea water as product;

(g) recovering said magnesium ammonium phosphate precipitate; and (h) employing said magnesium ammonium phosphate precipitate as the bed for further concentration of trace element metallic cations from additional quantities of raw sea water.

6. The method of treating sea water comprising percolating the sea water through a replacement bed of $MgNH_4PO_4 \cdot H_2O$, whereby at least a portion of the Mg in the $MgNH_4PO_4 \cdot H_2O$ is replaced by Ca, Fe, and Zn ions from the sea water.

References Cited in the file of this patent

UNITED STATES PATENTS 2,516,659     Stenger _____ July 25, 1950

OTHER REFERENCES

McPherson and Henderson book "A Course in General Chemistry," 3rd Edition, 1927, pages 272 and 585, published by Ginn & Co., New York.

"Chromatography" book by Heftmann, 1961, Reinhold Pub. Corp., New York, pages 56 and 57.

UNITED STATES PATENT OFFICE
CERTIFICATE OF CORRECTION

Patent No. 3,155,454                                                November 3, 1964

Murrell L. Salutsky et al.

It is hereby certified that error appears in the above numbered patent requiring correction and that the said Letters Patent should read as corrected below.

Column 4, line 71, for "manganese" read -- magnesium --.

Signed and sealed this 18th day of May 1965.

(SEAL)
Attest:

ERNEST W. SWIDER                                   EDWARD J. BRENNER
Attesting Officer                                         Commissioner of Patents